United States Patent
Koyama et al.

(10) Patent No.: US 7,584,063 B2
(45) Date of Patent: Sep. 1, 2009

(54) MULTIVARIABLE TRANSMITTER AND COMPUTATION PROCESSING METHOD OF THE SAME

(75) Inventors: Etsutaro Koyama, Musashino (JP); Masaru Nakagawa, Musashino (JP); Akio Ito, Musashino (JP); Atsuko Suzuki, Musashino (JP)

(73) Assignee: Yokagawa Electric Corporation, Tokyo (JP)

( * ) Notice: Subject to any disclaimer, the term of this patent is extended or adjusted under 35 U.S.C. 154(b) by 54 days.

(21) Appl. No.: 11/004,025

(22) Filed: Dec. 3, 2004

(65) Prior Publication Data
US 2005/0125190 A1 Jun. 9, 2005

(30) Foreign Application Priority Data
Dec. 5, 2003 (JP) .......................... P2003-407278
Oct. 8, 2004 (JP) .......................... P2004-295730

(51) Int. Cl.
*G01F 1/00* (2006.01)
*G01L 7/00* (2006.01)
(52) U.S. Cl. .......................................... 702/47; 73/700
(58) Field of Classification Search .................. 702/47, 702/50, 56, 127, 138, 33, 45, 52, 53, 54, 702/189; 73/718, 861.03, 861.02, 861.18, 73/700, 702, 704, 715, 716, 720, 721, 1.16, 73/1.35, 1.57, 37, 152.18, 152.21, 152.29, 73/861, 861.42, 861.43, 861.47; 310/338, 310/314, 321, 324; 375/295; 700/282, 301; 377/21; 137/557
See application file for complete search history.

(56) References Cited

U.S. PATENT DOCUMENTS

| 5,495,769 | A | | 3/1996 | Broden et al. .................. 73/718 |
|---|---|---|---|---|
| 5,606,513 | A | * | 2/1997 | Louwagie et al. ........... 702/138 |
| 5,754,596 | A | * | 5/1998 | Bischoff et al. ............. 375/295 |
| 5,870,695 | A | * | 2/1999 | Brown et al. ................. 702/138 |
| 5,899,962 | A | * | 5/1999 | Louwagie et al. ........... 702/138 |
| 6,041,659 | A | * | 3/2000 | Wilda et al. .................... 73/720 |
| 6,487,912 | B1 | * | 12/2002 | Behm et al. ................... 73/753 |
| 6,529,847 | B2 | | 3/2003 | Hamilton et al. ............ 702/127 |
| 6,820,501 | B2 | * | 11/2004 | Roesler et al. ........... 73/861.66 |
| 6,979,995 | B2 | * | 12/2005 | Horio et al. .............. 324/76.48 |
| 7,085,610 | B2 | * | 8/2006 | Eryurek et al. ................. 700/29 |

(Continued)

FOREIGN PATENT DOCUMENTS

JP 1006837 1/1989

OTHER PUBLICATIONS

Saigusa et al., Intelligent Differentail Pressure Transmitter Using Micro-Resonators, 1992 IEEE, pp. 1634-1639.*

(Continued)

*Primary Examiner*—Edward R Cosimano
*Assistant Examiner*—Toan M Le
(74) *Attorney, Agent, or Firm*—Nutter McClennen & Fish LLP; John J. Penny, V

(57) ABSTRACT

A multivariable transmitter has a microprocessor for executing a computation processing task such as calculating a differential pressure value and static pressure with using a plurality of physical quantity signals. The microprocessor executes a processing for obtaining data from a sensor every computation processing task and executes the computation processing task in a time-division manner.

7 Claims, 6 Drawing Sheets

U.S. PATENT DOCUMENTS 7,111,491 B2 * 9/2006 Kosh et al. .................. 73/1.57

OTHER PUBLICATIONS

Shimada et al., Intelligent Differential Pressure Transmitter with Multiple Sensor Formed on a (110)-Oriented Circular Silicon Diaphragm, Oct. 1991, IEEE Transactions on Industrial Electronics, vol. 38, No. 5, pp. 379-384.*

Matsuoka et al., Designing Method for Sensing Body Mechanism of Differential Pressure Transmitter Using Silicon Diaphragm Type Pressure Sensor, 1994 IEEE, pp. 1229-1232.*

Saigusa et al., DPHARP Series Electronic Differential Pressure Transmitters, 1992, Yokogawa Technical report, No. 15, pp. 30-37.*

Matsuoka et al., Differential Pressure/Pressure Transmitters Applied with Semiconductor Sensors, May 1986, IEEE Transactions on Industrial Electronics, vol. IE-33, No. 2, pp. 152-157.*

Clark, C., A Differential Pressure Transducer for the Measurement of High-Frequency Fluctuations in Liquids, 1985, J. Phys. E: Sci. Instrum., vol. 18, pp. 297-302.*

Shimada et al., Intelligent Differential Pressure Transmitter with a Multiple Sensor Formed on (110) Oriented Circular Silicon Diaphragm, 1990 IEEE, pp. 631-635.*

Saigusa et al., Intelligent Differential Pressure Transmitter Using Micro-Resonators, 1992 IEEE, pp. 1634-1639.*

Rowe et al., "Advanced Sensor Technology Key to New Multivariable Transmitter", Nov. 1, 1999.

http:www.emersonprocess.com/rosemount/products/flow/m3095mv.html (1996).

Rosemount 3095 Multivariable Mass Flow Transmitter with Hart or Foundation Fieldbus Protocol, May 2008.

* cited by examiner

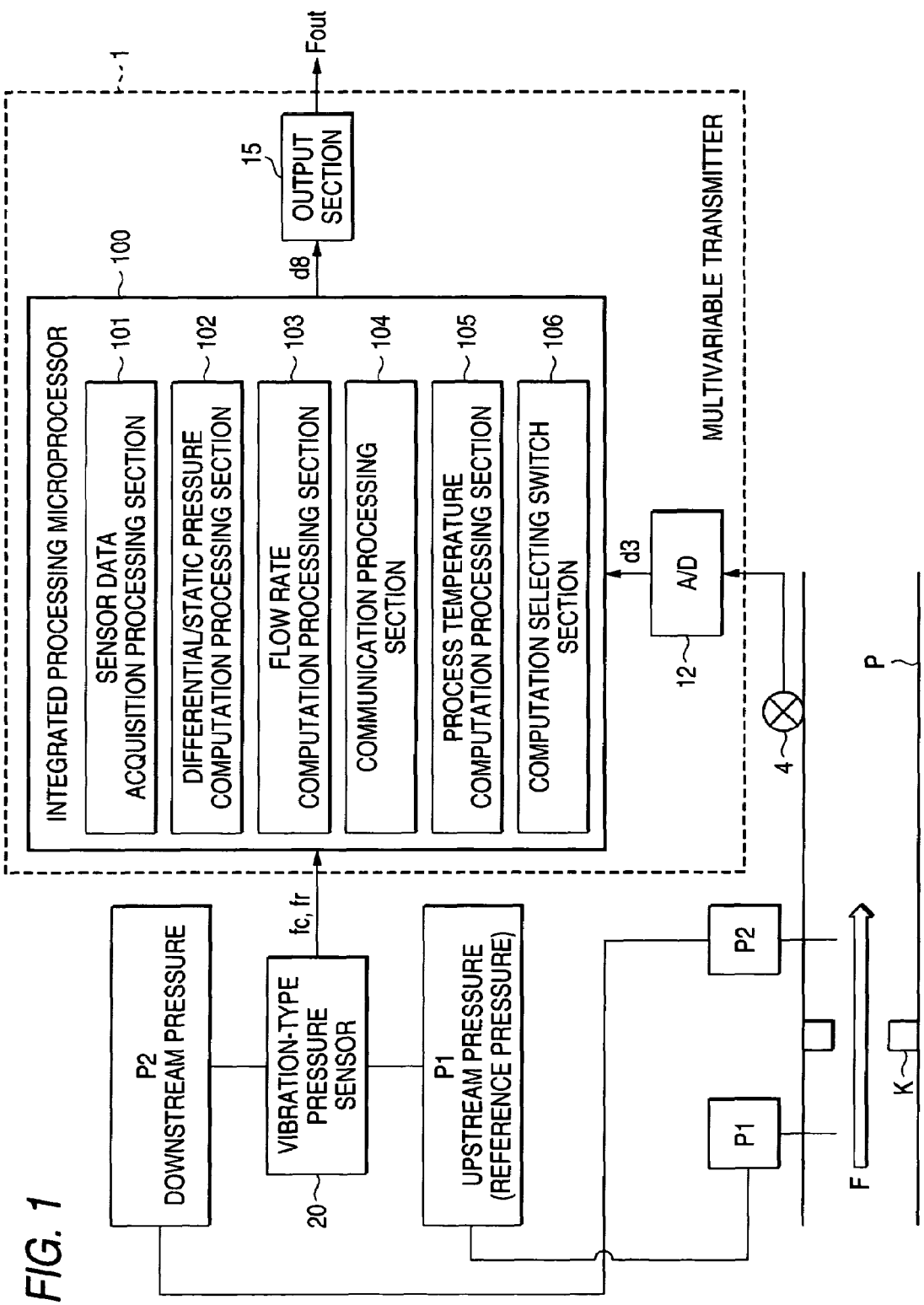

FIG. 2

| COMPUTATION PROCESSING | FIRST ROUND | SECOND ROUND | THIRD ROUND | FOURTH ROUND |
|---|---|---|---|---|
| SENSOR DATA ACQUISITION PROCESSING | 1 | 1 | 1 | 1 |
| DIFFERENTIAL PRESSURE COMPUTATION PROCESSING | 1 | | 1 | |
| STATIC PRESSURE COMPUTATION PROCESSING | 1 | | 1 | |
| FLOW RATE COMPUTATION PROCESSING | | 1 | | 1 |
| COMMUNICATION OUTPUT PROCESSING | | 1 | | 1 |
| PROCESS TEMPERATURE COMPUTATION PROCESSING 1 | 1 | | | |
| PROCESS TEMPERATURE COMPUTATION PROCESSING 2 | | 1 | | |
| PROCESS TEMPERATURE COMPUTATION PROCESSING 3 | | | 1 | |
| PROCESS TEMPERATURE COMPUTATION PROCESSING 4 | | | | 1 |

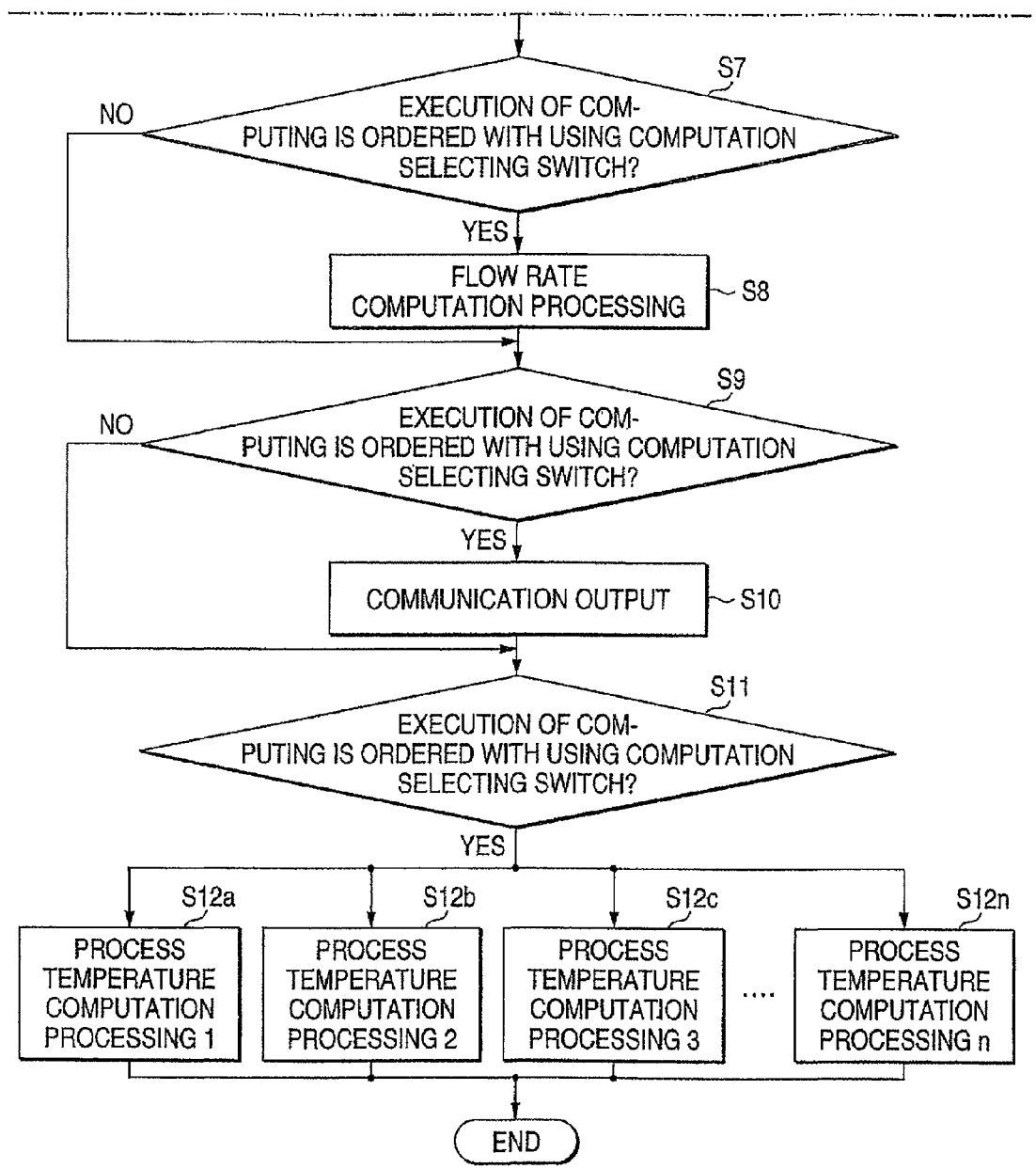

| RESISTANCE VALUE R | R1 | R2 | .... | Ri | Ri + 1 | .... | R64 |
|---|---|---|---|---|---|---|---|
| TEMERATURE VALUE t | t1 | t2 | .... | ti | ti + 1 | .... | t64 |

MULTIVARIABLE TRANSMITTER AND COMPUTATION PROCESSING METHOD OF THE SAME

BACKGROUND OF THE INVENTION

1. Field of the Invention

The present invention relates to a multivariable transmitter which executes various computation processing tasks using various physical quantity signals.

2. Description of the Related Art

The following documents are referred to as related art regarding a multivariable transmitter.
1. U.S. Pat. No. 5,495,769
2. U.S. Pat. No. 6,529,847
3. "Advanced Sensor Technology Key to New Multivariable Transmitter" Foxboro InterKama-ISA TECH Sessions (Paper Session) 1 Nov. 1999

In addition, JP-B-H8-10169 is also referred to as a related art regarding a resonant-type pressure sensor.

A typical multivariable transmitter is designed so that two or more physical quantity signals detected from a process are input to the transmitter to calculate mass flow using microprocessors, and the mass flow thus calculated is output to a two-wire transmission line as a 4-20 mA analog current signal, for example. Alternatively, the multivariable transmitter has a communication section compatible with communication standard based protocols and outputs digital information, such as the results of computation processing, to a fieldbus.

In addition, such a multivariable transmitter as described above obtains information and data, including tuning parameters, from a higher equipment not illustrated in the drawings.

FIG. 6 is a functional block diagram illustrating an example of a related art multivariable transmitter.

In the example illustrated in FIG. 6, an aperture mechanism K such as an orifice is provided on a pipe P, and a multivariable transmitter 1 detects an upstream pressure P1 and a downstream pressure P2 of a fluid F as physical quantities and outputs a flow rate signal Fout.

More specifically, the multivariable transmitter 1 is provided with a differential pressure sensor 2 for detecting the difference between the upstream pressure P1 and the downstream pressure P2 and a static pressure sensor 3 for detecting the difference between a vacuum pressure and the upstream pressure P1 defined as a reference pressure, wherein a process temperature sensor 4 for detecting the temperature of the fluid F within the pipe P is connected to the multivariable transmitter 1.

Signals detected by the differential pressure sensor 2, the static pressure sensor 3 and the process temperature sensor 4 are introduced to the multivariable transmitter 1 as physical quantities and converted by A/D converters 10, 11 and 12 to digital signals d1, d2 and d3. These digital signals are supplied to a first microprocessor 13 and a second microprocessor 14 to be subjected to computation processing.

The pressures before and after the aperture mechanism K provided in the pipe P (the upstream pressure P1 and the downstream pressure P2) and the vacuum pressure are introduced to two diaphragm sensors, i.e., the differential pressure detection diaphragm of the differential pressure sensor 2 and the static pressure detection diaphragm of the static pressure sensor 3, through the pipe P illustrated in FIG. 6. Thus one diaphragm (the differential pressure detection diaphragm) measures the differential pressure and the other diaphragm (the static pressure detection diaphragm) measures the static pressure.

In U.S. Pat. No. 5,495,769 mentioned above, pressures before and after the aperture mechanism K are introduced to two physically different diaphragms, i.e., a volumetric differential pressure diaphragm and a strain-gauge static pressure diaphragm, using independent lead pipes.

In the document "Advanced Sensor Technology Key to New Multivariable Transmitter" mentioned above, a diaphragm sensor is formed by means of silicon etching. This diaphragm sensor is illustrated as one having virtually two diaphragms by providing a vacuum chamber within a part of the sensor's diaphragm.

More specifically, the sensor is structured so that an upstream pressure P1 and a downstream pressure P2 are introduced to the diaphragm corresponding to the differential pressure sensor, and the upstream pressure P1 and the vacuum pressure of the vacuum chamber are introduced to the diaphragm corresponding to the static pressure sensor. In this example, a strain gauge is used as the detection device.

Now referring back to the example illustrated in FIG. 6, the differential pressure signal and the static pressure signal obtained from the differential pressure sensor 2 and the static pressure sensor 3 are A/D-converted and supplied to the first microprocessor 13.

The first microprocessor 13 receives an input of digital signals d1 and d2 corresponding to output signals from the differential pressure sensor 2 and the static pressure sensor 3. The first microprocessor 13 then performs computation processing to output a digital differential pressure signal d4 and a digital static pressure signal d5.

The second microprocessor 14 receives an input of the digital differential pressure signal d4 and the digital static pressure signal d5, as well as the digital signal d3 representative of the process temperature (temperature of the fluid F) from the process temperature sensor 4. The second microprocessor 14 then performs computation processing of flow rates and outputs a digital signal d6 representative of the mass flow.

Also, the process temperature sensor 4 is formed of a resistance temperature sensor (RTD, Pt100). Then, the A/D converter 12 generates the digital signal d3 corresponding to a resistance value of the resistance temperature sensor. Also, the second microprocessor 14 calculates a temperature value from the digital signal d3 which is the resistance value.

Specifically, based on an IEC computation formula, the second microprocessor 14 calculates an initial value and performs a successive approximation method three times and calculates a temperature value. Then, according to this computation method, the maximum error (temperature error) of values of temperatures from −200° C. to 850° C. results in about 0.023° C.

An output section 15 receives an input of the digital signal d6 representative of the mass flow, D/A-converts the digital signal d6, changes the digital signal to the flow rate signal Fout appropriate for the mass flow span, and transfers the flow rate signal Fout to a two-wire transmission line or a fieldbus.

A third microprocessor 16 is a block that processes communications between the multivariable transmitter 1 and a higher equipment not illustrated in the drawing according to given communication protocols. In addition, the third microprocessor 16 and the second microprocessor 14 exchange a communication data d7 with each other.

The multivariable transmitter configured in such a manner as described above has had the following problems, however.
(1) The multivariable transmitter uses three microprocessors to perform differential pressure computation processing, static pressure computation processing, flow rate computation processing and communication processing. The transmitter thus involves a relatively large number of components and therefore is costly.
(2) Since the multivariable transmitter performs the differential pressure computation processing, the static pressure computation processing, the flow rate computation processing and the communication processing with using separate microprocessors, it has been incapable of processing based on the effective use of mutually independent information.
(3) Since the multivariable transmitter performs the differential pressure computation processing, the static pressure computation processing, the flow rate computation processing and the communication processing in a sequential manner with using three microprocessors, data simultaneity and response characteristics have been unacceptably poor.
(4) Since the multivariable transmitter is structured so that the upstream pressure P1 and the downstream pressure P2 are introduced to the differential pressure sensor 2 and the upstream pressure P1 and the vacuum pressure are introduced to the static pressure sensor 3, wherein the vacuum pressure of the vacuum chamber is introduced alternatively case by case, the arrangement of lead pipes has been unacceptably complicated.
(5) Since the differential pressure sensor 2 and the static pressure sensor 3 are blocks for outputting analog signals, the output signals may drift depending on environmental conditions, such as temperature. In addition, the A/D converters 10 and 11 must be provided for the differential pressure sensor 2 and the static pressure sensor 3 independently, thus involving an increase in the number of components used and causing the transmitter to be all the more costly.

Also, there is a problem that cost becomes high since it is necessary for the second microprocessor 14 to perform numerous computations in order to calculate a temperature value.

Further, there is a problem that computation time cannot be reduced remarkably even in the case of using polynomial approximation by regression curve approximation with respect to the IEC computation formula.

Specifically, when the IEC computation formula is approximated by a regression curve of sixth order, the computation time can be reduced about half but the temperature error increases about double. Therefore, the computation time is traded off for the temperature error.

Also, it is required that the multivariable transmitter should have small size and low power consumption.

SUMMARY OF THE INVENTION

The object of the present invention is to provide a multivariable transmitter in which the number of components used is reduced to minimize the cost of the system as a whole, and the mutual utilization and simultaneity of data in each type of computation processing are enhanced, as well as its reliability are improved.

(1) The invention provides a multivariable transmitter having: a single microprocessor for executing a plurality of computation processing tasks with using a plurality of physical quantity signals, wherein the microprocessor executes the plurality of computation processing tasks in a time-division manner.
(2) In the multivariable transmitter, the computation processing tasks include a computation selecting processing which selects a processing item to be executed during each computation period.
(3) In the multivariable transmitter, the computation processing tasks include a computation processing task to be divided and executed through a plurality of computation periods.
(4) In the multivariable transmitter, the computation processing tasks include computation processing tasks for calculating a differential pressure value and a static pressure value regarding a fluid to be measured.
(5) In the multivariable transmitter, the computation processing tasks include a flow rate computation processing task based on the differential pressure value, the static pressure and a temperature value regarding the fluid to be measured.
(6) In the multivariable transmitter, the computation processing tasks include a communication processing computation task for transferring physical quantity data or computed data to a higher equipment by means of communication and obtaining various types of data from the higher equipment.
(7) In the multivariable transmitter, a sensor for detecting the physical quantity is a resonant-type pressure sensor which has a single pressure sensitive diaphragm and detects differential pressure and static pressure by means of computation.
(8) The invention also provide a multivariable transmitter having: a microprocessor for executing a computation processing task with using a plurality of physical quantity signals, wherein the microprocessor executes a processing for obtaining data from a sensor every computation processing task and executes the computation processing task in a time-division manner.
(9) In the multivariable transmitter, the computation processing tasks include a computation selecting processing which selects a processing item to be executed during each computation period, and a process temperature value computation processing task to be divided and executed through a plurality of computation periods.
(10) The multivariable transmitter further has a table for showing a setting indicating a combination of a selection by the computation selecting processing and a division processing function.
(11) In the multivariable transmitter, the sensor is a resonant-type pressure sensor which outputs a first resonance frequency and a second resonance frequency.
(12) The multivariable transmitter further has: a resistance temperature sensor provided in an atmosphere of a process temperature; and a nonvolatile data table for storing resistance values of the resistance temperature sensor and temperature values corresponding to the resistance values, wherein the microprocessor calculates a temperature value by an interpolation computation based on the resistance values and the data table.
(13) In the multivariable transmitter, the resistance values are formed at intervals in the data table, and a linear interpolation equation is used for the interpolation computation.
(14) The invention also provide a computation processing method of a multivariable transmitter which executes a plurality of computation processing tasks with using a plurality of physical quantity signals, involving the steps of: setting a computation selection switch which aligns a computation selection and a division processing; executing a processing for obtaining data from a sensor; and executing a processing in a case that a computation is executed by the computation selection switch.

The multivariable transmitter and the computation processing method provide the following advantageous effects.
(1) The multivariable transmitter uses only one microprocessor to perform the static pressure computation processing, the flow rate computation processing and the communication processing, in addition to the differential pressure computation processing performed by a typical transmitter. Consequently, it is possible to reduce the number of components used and the cost.

(2) The multivariable transmitter performs respective types of processing using only one microprocessor. Consequently, it is possible to systematically control each type of processing. Thus, it is easy to perform each type of processing in an optimum amount of time using a computation selecting switch section.

More specifically, large amounts of processing time are allocated to important types of processing, such as the processing for obtaining data from the sensor, the differential pressure computation processing, the static pressure computation processing, the flow rate computation processing and the communication processing, while a small amount of processing time is allocated to process temperature computation processing that does not require fast response. In this way, load on the microprocessor is distributed as necessary. Consequently, it is possible to perform computation processing in a more efficient manner.

The multivariable processor performs the differential pressure computation processing, the static pressure computation processing, the flow rate computation processing and the communication processing under optimum load distribution, including load distribution based on the division processing, using only one microprocessor. Consequently, the transmitter provides excellent data simultaneity and a response characteristics is improved.

(3) The multivariable transmitter is designed to use only one resonant-type pressure sensor serving as both pressure and differential pressure sensors. Consequently, it is possible to reduce the number of components used for the sensor. In addition, piping to introduce pressure from the fluid is simplified, thereby eliminating the need for complicated piping.

The resonant-type pressure sensor outputs the first resonance frequency signal fc and the second resonance frequency signal fr and calculates the differential and static pressures according to these signals. Consequently, there is no need to equip individual sensors with separate A/D converters as has been done conventionally. In addition, since the signal is not an analog signal but of the frequency type, the multivariable transmitter is not susceptible to environmental effects such as temperature, which has been the case with conventional multivariable transmitters.

BRIEF DESCRIPTION OF THE DRAWINGS

FIG. 1 is a functional block diagram illustrating one embodiment of a multivariable transmitter to which the present invention has been applied;

FIG. 2 is a table showing an example of settings provided by a combination of a switching section for selecting computation types and a division processing function;

FIG. 3A and FIG. 3B show a flowchart illustrating the procedure of an integrated processing microprocessor 100 in a time-series manner.

DETAILED DESCRIPTION OF THE PREFERRED EMBODIMENT

The present invention will now be described in detail by referring to the accompanying drawings.

FIG. 1 is a functional block diagram illustrating one embodiment of a multivariable transmitter to which the present invention has been applied.

Figure 6:
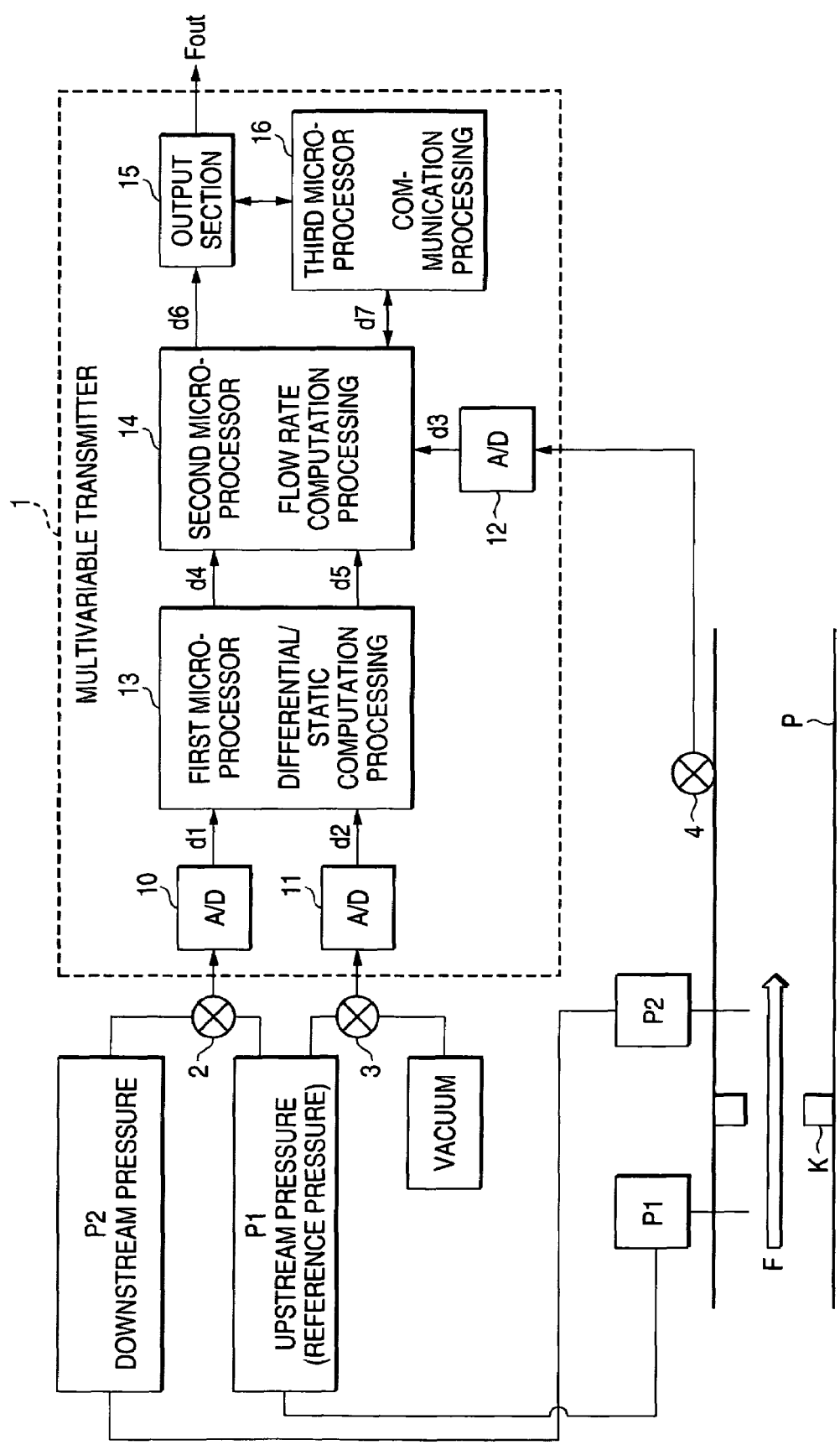
FIG. 6 is a functional block diagram illustrating an example of a related art multivariable transmitter.

In FIG. 1, elements identical to those of the multivariable transmitter as the related art illustrated in FIG. 6 are referenced alike and excluded from the description given below. In the following description, the characteristic features of the present invention are discussed.

In FIG. 1, a multivariable transmitter 111 in accordance with the present invention uses a resonant-type pressure sensor 20 to output signals representative of the upstream pressure P1 and the downstream pressure P2 of the fluid F running before and after the aperture mechanism K in the pipe P as a first resonance frequency signal fc and a second resonance frequency signal fr of the pressure sensitive diaphragm.

Since the structure and operating principle of the resonant-type pressure sensor 20 are disclosed in detail in JP-B-H8-10169 mentioned earlier, they are not discussed here.

In the multivariable transmitter 111, a single integrated processing microprocessor 100 receives an input of resonator outputs as digital signals, i.e., the first resonance frequency signal fc and the second resonance frequency signal fr from resonant-type pressure sensor 20.

The multivariable transmitter 111 also receives an input of the digital signal d3 representative of the temperature of the fluid F from the process temperature sensor 4.

The digital signals representative of these multiple physical quantities detected from a process are submitted for computation processing based on the time division processing functions of the single integrated processing microprocessor 100. As a result, a digital signal d8 representative of the mass flow is transmitted to the output section 15.

In the integrated processing microprocessor 100, a sensor data acquisition processing section 101 periodically obtains digital signals (the first resonance frequency signal fc and the second resonance frequency signal fr) from the resonant-type pressure sensor 20 and updates them.

A differential/static pressure computation processing section 102 performs a computation processing according to the obtained digital signals (the first resonance frequency signal fc and the second resonance frequency signal fr), in order to determine the differential and static pressures of the fluid F.

A flow rate computation processing section 103 calculates the flow rate of the fluid F using the calculated differential and static pressures and the process temperature, corrects the density of the fluid F, calculates the mass flow, and outputs the digital signal d8 to the output section 15.

A communication processing section 104 transmits physical quantity data input to the integrated processing microprocessor 100 and computed and processed data to a higher equipment by means of communication. In addition, the communication processing section 104 obtains parameter tuning data, for example, from the higher equipment.

A process temperature computation processing section 105 calculates the process temperature of the fluid F according to the digital signal d3 from the process temperature sensor 3 and the A/D converter 12.

One feature of the computation processing carried out in the present embodiment is the incorporation of a computation selecting switch section 106. The computation selecting switch section 106 is configured so that users determine the order in which multiple items are processed at computation intervals and arbitrarily specify or select items to be processed. Consequently, it is possible to skip the computations that need not be processed at computation intervals.

The computation selecting switch section 106 makes it easy to execute each type of computation processing in an optimum amount of time. More specifically, large amounts of microprocessor-based processing time are allocated to types of processing at high levels of importance (or priority), such as the processing for obtaining data from individual sensors, the differential/static pressure computation processing, the flow rate computation processing and the communication processing, and only a small amount of processing time is allocated to perform the temperature computation processing that is low in importance (or priority) and does not require fast response. In this way, the allocation of load on the microprocessor is defined as necessary or according to the importance of the processing. Consequently, it is possible to perform computation processing efficiently.

Another feature of the computation processing carried out in the embodiment is the incorporation of a function in which types of processing featuring relatively large time constants, such as a process temperature computation processing, are performed with their computation period divided into multiple periods. Like the function of the computation selecting switch section 106, this function makes it possible to distribute the load of the microprocessor as necessary and perform computation processing efficiently.

FIG. 2 is a table showing an example of settings provided by a combination of the computation selecting switch section 106 and the division processing function. According to this example, the table indicates whether each type of computation processing is performed (represented as "1") or skipped (represented as "blank") for each of the four computation periods.

As is evident from this table, the processing for obtaining data from the resonant-type pressure sensor 20 is performed at every round of computation processing, as this processing is at a high level of importance. The differential pressure computation processing and the static pressure computation processing, which are at a medium level of importance, are performed at the first and third rounds of computation processing. Likewise, the flow rate computation processing and the communication output processing are performed at the second and fourth rounds of computation processing.

The process temperature computation processing, which is less important, is divided into four rounds of processing. In other words, the process temperature computation processing 1 to 4 are separately performed over the first to fourth rounds of computation processing.

According to an assignment of the computation selection and the division processing as discussed above, items to be processed at each computation period are leveled into four processing. Consequently, it is possible to optimize the load distribution of the microprocessor. Note that although in the example shown in the table of FIG. 2, process temperature computation processing has been divided into four rounds, it is possible to divide this computation processing into the desired number of rounds.

Figure 3A:
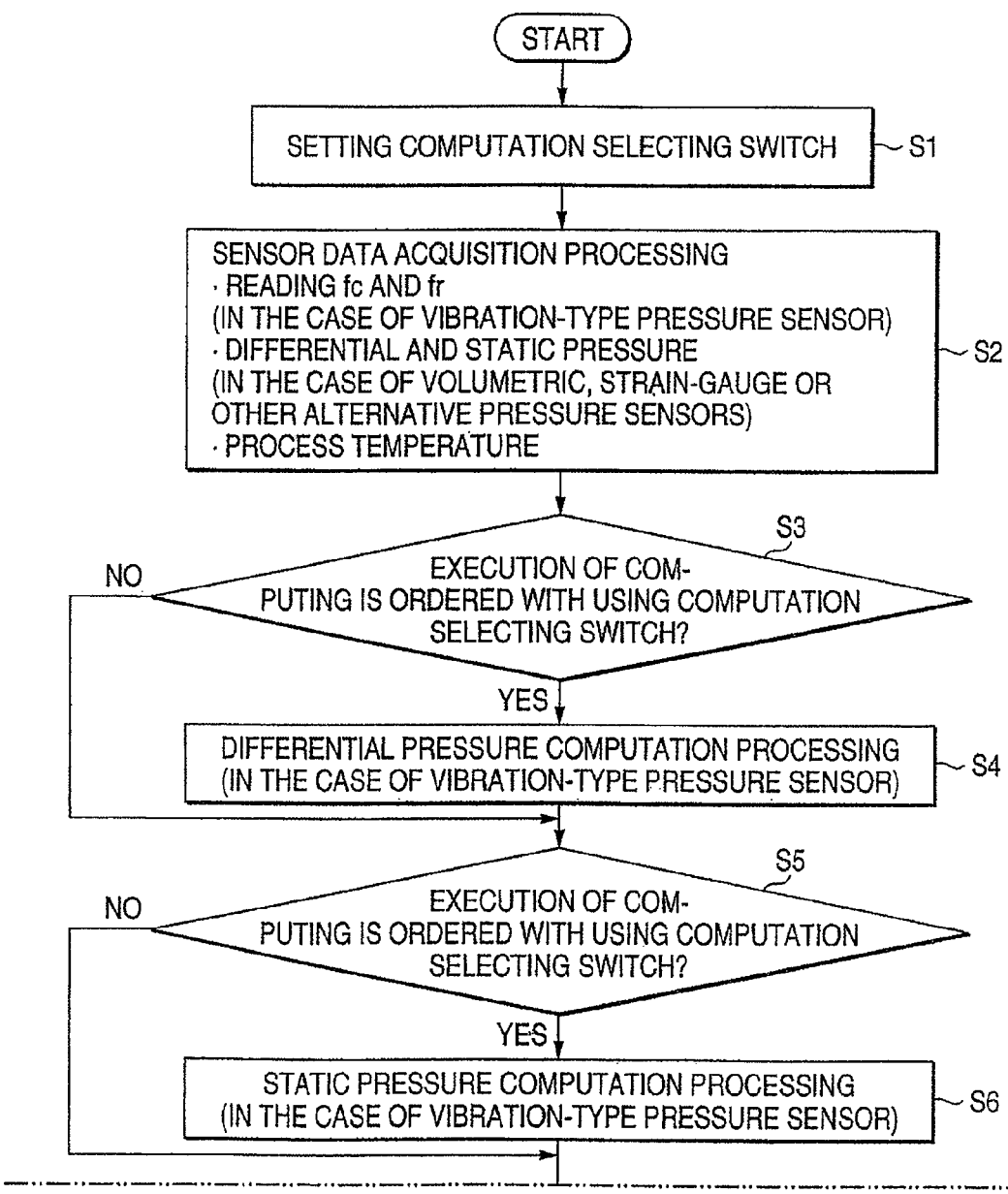

FIG. 3A and FIG. 3B show a flowchart illustrating the procedure of the integrated processing microprocessor 100 in a time-series manner.

In the flowchart, the computation selecting switch section 106 is first configured in step S1; that is, the order of computing, the processing time, the number of divisions of processing, and other items are defined.

In step S2, processing for data acquisition from the resonant-type pressure sensor 20 is performed. In the embodiment illustrated in FIG. 1, the multivariable transmitter 111 reads the first resonance frequency signal fc and the second resonance frequency signal fr of the resonant-type pressure sensor 20. In addition, the multivariable transmitter 111 obtains temperature data on the fluid F from the process temperature sensor 4.

If execution of computing is ordered by the computation selecting switch 106 in a query made in any of steps S3, S5, S7 and S9, either the differential pressure computation processing in step S4, the static pressure computation processing in step S6, the flow rate computation processing in step S8, or the communication output processing in step S10 is executed.

If execution of computing has not been ordered up to the query in step S9 but is ordered in the query in step S11 by the computation selecting switch section 106, the first round of processing, i.e., the process temperature computation processing 1 is executed in step S12a. This first period of processing is thus completed.

In this example, the process temperature computation processing has been divided into n rounds thereof, including the process temperature computation processing 2 and later in step S12b, S12c, . . . , S12n. These rounds of process temperature computation processing are executed in sequence during each processing period.

As described above, by providing only one microprocessor 100 in the multivariable transmitter 111, it is possible to efficiently execute multiple types of computation processing and reduce the number of components used.

Since the resonant-type pressure sensor 20 is used as the pressure and differential pressure sensors, the piping is simplified as illustrated in FIG. 1. In addition, since the resonant-type pressure sensor 20 outputs the resonance frequency signals fc and fr, rather than analog signals, the resonant-type pressure sensor 20 is not susceptible to temperature drifts or any other adverse effects.

Computation in the process temperature computation processing section 105 mentioned above will be described below in detail. The process temperature computation processing section 105 has a data table (not shown) which is a nonvolatile storage section formed of n pairs of resistance values and temperature values.

Figures 4, 5:
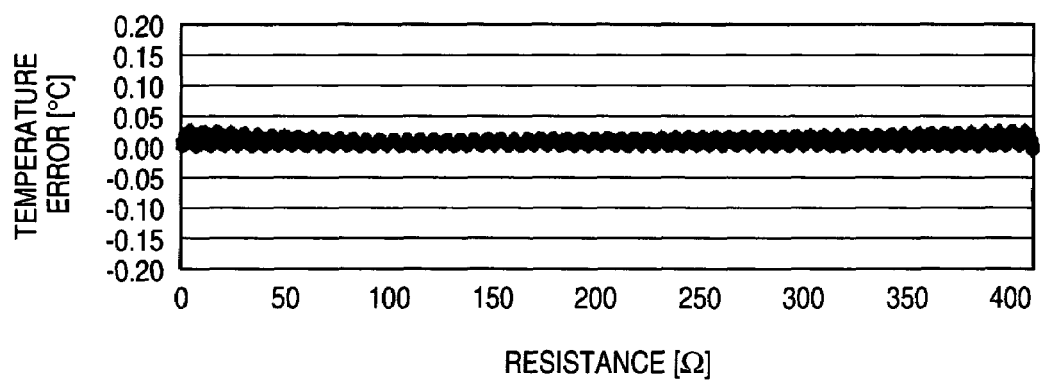
FIG. 4 is a diagram showing one example of the data table of the invention.
FIG. 5 is a diagram showing characteristics of a temperature error in the example of FIG. 1.

This data table will be described using FIG. 4. FIG. 4 is a diagram showing one example of the data table of the invention.

In FIG. 4, the data table is formed of about 64 pairs (R, t). For example, it is formed of about 64 pairs with respect to temperature values t ranging from about −200° C. to about 850° C. Also, for example, the temperature values t have values to the about fourth decimal place.

Further, resistance values R are formed at regular intervals. For example, the resistance values R are formed regularly at intervals of about 6.5 Ω. Furthermore, for example, they are formed in the range from about 0 Ω to about 400 Ω.

The process temperature computation processing section 105 calculates a temperature value by interpolation computation based on the data table and a resistance value of the digital signal d3.

Specifically, a temperature value t is linearly interpolated from a temperature value $t_i$ paired with a resistance value $R_i$ of the data table and a temperature value $t_{i+1}$ paired with a resistance value $R_{i+1}$ of the data table with respect to a resistance value R of a digital signal d3.

That is, the temperature value t corresponding to the resistance value R satisfies the following formula (1) of interpolation of first degree (where resistance value $R_i$<resistance value R<resistance value $R_{i+1}$). Also, it is assumed that the resistance value $R_i$ and the resistance value $R_{i+1}$ are values close to the resistance value R. Then, the resistance value $R_i$ and the resistance value $R_{i+1}$ adjoin on the data table.

$$t=(t_{i+1}-t_i)\cdot(R-R_i)/(R_{i+1}-R_i)+t_i \quad (1)$$

Therefore, in the example of FIG. 1, the temperature value can be calculated by simple and easy computation. Also, computation becomes simple and easy by comprising the data table. Further, by the computation of interpolation, a temperature error reduces while suppressing memory capacity of the data table.

Also, it was shown by simulation that a high computation speed can be obtained when the resistance values R are formed at regular intervals in the data table.

Temperature characteristics in the case of using the data table of FIG. 4 will be described using FIG. 5. FIG. 5 is a diagram showing characteristics of a temperature error in the example of FIG. 1. In FIG. 5, the axis of abscissa is a resistance value R [Ω] and the axis of ordinate is a temperature error [° C.].

It was shown by simulation that characteristics of about 0.024° C. can be obtained in the range from a resistance value of 0 to a resistance value of 400, that is, from −200° C. to 850° C. in the temperature error of the example of FIG. 1. That is, the temperature error of the example of FIG. 1 becomes equal to a temperature error of the conventional example (IEC computation formula) of FIG. 6.

Then, it was newly shown by simulation that an about quintuple computation speed can be obtained with respect to computation of the IEC computation formula according to computation based on the formula (1) and the data table of FIG. 4. That is, computation time can be reduced to about one-fifth.

Therefore, it was newly shown by simulation that a computation processing method of such a process temperature computation processing section 105 can provide the optimum characteristics for the multivariable transmitter 111 in which small size and low power consumption are required.

Then, a configuration of forming the data table in which a temperature error results in a predetermined range by computation of interpolation satisfying the formula of interpolation of first degree provides the optimum characteristics for the multivariable transmitter 111.

Also, the invention is not limited to the example described above, and further includes many changes and modifications without departing from the essence.

What is claimed is:

1. A multivariable transmitter comprising:
a single microprocessor for executing a plurality of computation processing tasks using a plurality of physical quantity signals; and
an output section for outputting an output of said multivariable transmitter,
wherein the single microprocessor executes the plurality of computation processing tasks in a time-division manner, wherein every computation processing task is not executed during every computation processing period, such that high priority computation processing tasks are executed more frequently than low priority computation processing tasks, the computation processing tasks include a computation processing task for calculating a differential pressure value and a static pressure value of a fluid to be measured, and a flow rate computation processing task based on the differential pressure value, the static pressure value and a temperature value of the fluid to be measured; and wherein
the computation processing tasks include a computation selecting processing which selects a processing item to be executed during each computation period, and a process temperature value computation processing task to be divided and executed through a plurality of computation periods, and
the temperature value of the fluid to be measured is a process temperature with respect to the fluid to be measured.

2. The multivariable transmitter according to claim 1, wherein the computation processing tasks include a communication processing computation task for transferring physical quantity data or computed data to a higher equipment by means of communication and obtaining various types of data from the higher equipment.

3. The multivariable transmitter according to claim 2, wherein a sensor for detecting the physical quantity is a resonant-type pressure sensor which has a single pressure sensitive diaphragm and detects differential pressure and static pressure by means of computation.

4. The multivariable transmitter according to claim 3, wherein the sensor is a resonant-type pressure sensor which outputs a first resonance frequency and a second resonance frequency.

5. The multivariable transmitter according to claim 4, further comprising:
a resistance temperature sensor provided in an atmosphere of a process temperature; and
a nonvolatile data table for storing resistance values of the resistance temperature sensor and temperature values corresponding to the resistance values,
wherein the microprocessor calculates a temperature value by an interpolation computation based on the resistance values and the data table.

6. The multivariable transmitter according to claim 5, wherein the resistance values are formed at intervals in the data table, and a linear interpolation equation is used for the interpolation computation.

7. A computation processing method of a multivariable transmitter which executes a plurality of computation processing tasks using a plurality of physical quantity signals, comprising the steps of:
setting a computation selection switch which assigns a computation selection and a division processing;
executing a processing for obtaining data from a sensor;
executing a processing when a computation is executed by the computation selection switch;
outputting an output of said multivariable transmitter;
selecting a processing item to be executed during each computation period;
dividing and executing a computation processing task through a plurality of computation periods such that every computation processing task is not executed during every computation processing period, such that high priority computation processing tasks are executed more frequently than low priority computation processing tasks;
calculating a differential pressure value and a static pressure value of a fluid to be measured; and
executing the computation processing tasks using a flow rate computation processing task based on the differential pressure value, the static pressure value and a temperature value of the fluid to be measured.

* * * * *